United States Patent [19]

Wiskur

[11] 4,335,879
[45] Jun. 22, 1982

[54] GAME APPARATUS AND MEANS FOR PLAYING THE SAME

[76] Inventor: Darrell D. Wiskur, Rte. 7, Harrison, Ark. 72601

[21] Appl. No.: 122,116

[22] Filed: Feb. 19, 1980

Related U.S. Application Data

[63] Continuation-in-part of Ser. No. 925,191, Jul. 17, 1978, abandoned.

[51] Int. Cl.³ .............................................. A63F 3/00
[52] U.S. Cl. .................................. 273/260; 273/146; 273/243; 434/81
[58] Field of Search ......................... 273/243, 146, 260

[56] References Cited

U.S. PATENT DOCUMENTS

| | | | |
|---|---|---|---|
| 1,480,360 | 1/1924 | Agee, Jr. ..................... | 273/146 X |
| 1,481,628 | 1/1924 | Souza ........................... | 273/146 |
| 1,595,906 | 8/1926 | Miller ........................... | 273/146 X |
| 2,672,344 | 3/1954 | Wakefield et al. .......... | 35/28.5 X |
| 3,450,408 | 6/1969 | Hagerman ................... | 273/146 |
| 3,532,342 | 10/1970 | Simpson et al. ............ | 35/28.5 X |
| 3,642,286 | 2/1972 | Moore .......................... | 273/243 |
| 3,794,326 | 2/1974 | Bialek .......................... | 273/243 X |
| 4,123,062 | 10/1978 | Wexler et al. ............... | 273/248 |

FOREIGN PATENT DOCUMENTS

456477 4/1950 Italy ................................... 273/146

*Primary Examiner*—Richard C. Pinkham
*Assistant Examiner*—Scott L. Brown
*Attorney, Agent, or Firm*—Haverstock, Garrett & Roberts

[57] ABSTRACT

A game apparatus for use in playing different color oriented type games utilizing dice-like colored game motivators wherein movement of a playing piece on a playing surface is determined and controlled by the cast of the motivators, the apparatus including a playing surface, a plurality of game playing pieces, and a pair of similar game playing motivators each including a dice-like member of cube shape defined by six surfaces arranged in opposed pairs, three of the surfaces each respectively having a different one of the primary colors of red, yellow and blue formed thereon, and the other three surfaces respectively having a different one of the secondary colors of orange, purple and green formed thereon, the motivators when rolled or cast like dice producing on their upper surfaces a plurality of different color combinations to control game moving options and movement of the playing pieces, including game options obtained by the combinations of two primary colors, combinations of primary and secondary colors, and the addition of other plays or moves obtained by the color combination of two different primary colors which result in a secondary color. The subject motivators may optionally be constructed so as to have different combinations of the various primary colors only on their surfaces.

6 Claims, 5 Drawing Figures

GAME APPARATUS AND MEANS FOR PLAYING THE SAME

This application is a continuation-in-part of application Ser. No. 925,191, filed July 17, 1978, now abandoned.

The present invention relates to a game apparatus which employs the principles of color and color combinations as the motivator to affect game play and, more particularly, wherein novel game playing motivators in the form of cube-like members each having their respective faces colored by different ones of the primary only or of the primary and secondary colors are utilized in conjunction with other game apparatus to determine and control the play or movement of gameplaying pieces. The novel colored motivators change the number of possible game plays or game move options that are available as compared to conventional motivators and may also be utilized in a wide variety of different color selection type games and other activities.

Many game playing motivators such as conventional dice, a spinner, the draw of cards or other similar devices as well as color cubes have been used in the past in the playing of a multitude of games to determine the play or movements a player is entitled to as a result of a cast of the dice or other similar motivators. Conventional dice and known color cubes, however, suffer from the disadvantage of being limited in the total number of game play possibilities that are available for each throw thereof. For example, conventional dice have six surfaces each with a different number of dots or other indicators or indica representing the possible combinations that can be produced for each turn or cast of the dice. By the same token, all known color cubes have had a random selection of different colors on their surfaces so that the total number of possible color combinations is limited to the number of colors on their respective faces and to combinations thereof but not to well known color combinations wherein the colors that turn up are combined in a well known way to produce a color that is different from either color that is displayed on the upside of each respective color cube. No known game motivators exist wherein the respective faces of each of two cube-like members is limited to being colored by different ones of the primary only or of the primary and secondary colors so as to increase the number of possible plays or moves that can be produced by each cast thereof as will be explained. This possibility for the present motivators makes it possible to use them in conjunction with other game apparatus to produce a greater number of possible plays or moves than are otherwise available from known motivators thereby increasing the game playing possibilities with a corresponding increase both not only in the game strategy for each respective turn but also in the overall interest in such a game. The closest known prior art to the present invention is disclosed in U.S. Pat. Nos. 1,561,592; 1,595,906; 1,481,628; 3,506,267; 3,055,662; 3,450,408 and 2,672,344, and in Italian Pat. No. 456,477 and French Pat. No. 1,105,682.

Furthermore, the prior art cube motivators for the most part work equally as well regardless of the colors used on their respective faces, whereas, the present motivators achieve their distinctive usefulness by limiting the colors used thereon to include the primary colors only or the primary and secondary colors only, and the present motivators will only function in accordance with these very specific color relationships or color formulas. The limitation to the primary and secondary colors as embodied in the present motivators teaches and produces new and useful results not found in the prior art including providing an increased number of potential plays or moves for each toss thereof. The same is not possible with other known devices including conventional dice and dice that use random colors other than the primary or the primary and secondary colors. In addition, by increasing the number of possible plays per toss or roll of the present motivators, the game strategy involved in playing a game controlled by such motivators can correspondingly be increased.

The present game motivators can be utilized in a wide variety of color selection type games to affect board position, move or selection. In a preferred embodiment of the present invention, the motivators are utilized in conjunction with a game apparatus that includes a game board or tray having a playing surface thereon which is divided into a plurality of individual adjacent areas disposed in a predetermined arrangement similar for example to a conventional tic-tac-toe or checkerboard design, and a plurality of colored playing pieces or objects for positioning and moving on the playing surface of the game board as determined by the cast of two color cubes or motivators. Each respective playing piece is colored by one of the primary or secondary colors and movement of the individual playing pieces is determined by the primary and/or secondary colors appearing on the upside of each game motivator after each throw thereof, the relationship between these colors being the working design that controls game play and determines game actions as will be hereinafter more fully disclosed. In addition, the above described game apparatus as well as all other color selection type games which utilize the present game playing motivators are designed primarily to be played competitively requiring that the players use their skills and abilities to recognize, distinguish, and combine colors to plan and execute their playing strategy. Additionally, the present motivators in conjunction with the various game apparatus with which they can be used offer the further possibility of teaching the primary and secondary colors and combinations thereof for educational and other purposes and can likewise be utilized to improve visual color recognition. It is also anticipated that the present game motivators can be utilized as the means for playing a variety of games including games that teach the basic colors and combinations thereof.

It is therefore a principal object of the present invention to teach the use of specifically colored dice-like motivators capable of producing a greater number of possible plays or moves from each throw thereof than prior motivators.

Another object is to increase knowledge of colors and color combinations.

Another object is to provide a relatively simple and easy to understand means for learning the basic colors and color combinations.

Another object is to provide means to substantially increase the number of possible plays or moves obtained by throwing two multi-colored dice-like members.

Another object is to provide a game apparatus which serves as an educational tool for the learning of colors while also providing an increased number of possibilities for moving game playing pieces.

Another object is to provide novel game motivator means that can be used in the playing of a number of different games and other activities, which motivator means provide a greater number of possible playing options than are available from conventional dice and known color cubes.

Another object is to provide means to expand on the strategy required to play certain games.

Another object is to provide a game playing apparatus which is entertaining, exhilerating, and fun to play as well as one which tests the color perception of the participants.

Another object is to provide a game apparatus which can be used to stimulate competition between the participants and which can also test and improve the relative color recognition and visual and mental skills of the participants.

Another object is to provide a game apparatus which is relatively inexpensive and easy to manufacture.

Another object is to teach the construction and operation of a relatively inexpensive yet versatile game that can be played and enjoyed by persons of all ages.

These and other objects and advantages of the present invention will become apparent after considering the following detailed specification in conjunction with the accompanying drawings, wherein.

Figure 1:
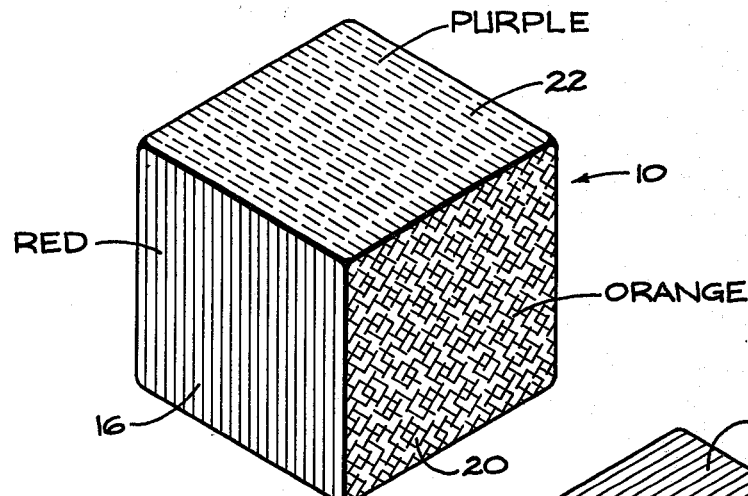
FIG. 1 is a perspective view showing a cube-like member constructed according to the teachings of one embodiment of the present invention.

Referring to the drawings more particularly by reference numbers, number 10 identifies a cube-like member or motivator having six surfaces arranged in opposed pairs. The cube 10 has each of its various surfaces colored with a specific color for very specific purposes, and at least two similar cubes are required in order to achieve the desired results. The cube 10 has a first surface 12 which is colored yellow, one of the primary colors, a second surface 14 colored blue, another primary color, and a third surface 16 colored red, the third primary color. The other three surfaces of the member 10, namely, surfaces 18, 20, and 22 are respectively colored by the secondary colors. For example the surface 18 is shown colored green which is the color obtained by combining the primary colors blue and yellow, the surface 20 is colored orange which is obtained by combining the primary colors red and yellow, and the surface 22 is colored purple which is obtained by combining the primary colors red and blue. The colors on the surfaces 12-22 can be arranged in any random manner so long as all of the primary and secondary colors are represented on different ones of the surfaces on each of the motivators. In addition, the cube 10 is a simple one piece balanced member which is constructed so as to equalize the possibility of each of its sides turning up when thrown on a playing surface.

At least one other cube, not shown, similar to the cube 10, is required in order to take advantage of the present invention. The other cube has the same primary and secondary colors arranged on its respective surfaces as in the case of the cube 10 but the arrangement of colors may be similar or different so long as all the primary and secondary colors are present on respective surfaces of each cube.

When a person plays a game using two of the cubes 10 as the motivators, as will be hereinafter more fully disclosed, he will throw them on a playing surface the same as if he were casting a pair of dice in order to establish his next move or play. Since the cubes 10 are similar balanced members, when thrown, each member may fall equally well with any one of its six faces appearing on the upside thereof and the probability of such an occurance for any particular face can be mathematically determined. The difference between the present cubes and the usual form of dice or color cubes is that with the present cubes it is possible to obtain a greater number of possible moves or plays for each toss thereof. This fact can also be used in determining the odds for the devices which will be different for some of the combinations than for others. For example, with the present cubes it is possible to obtain the usual number of possible combinations obtained by using two similar six sided cubes, each side of which has a different color on it, namely, thirty-six (36) possible combinations. It is also possible with the present cubes 10 to have two different primary colors turn up for each throw thereof giving six additional possibilities obtained by combining the primary colors to obtain the secondary color produced by mixing them. An example would be if a yellow and a red appeared on the upsides of the cubes this would result in the additional possible play or move of orange. This additional possibility is obtained by combining in a well known way the primary colors of yellow and red. The present cubes therefore provide the opportunity of establishing a greater number of possible moves or plays than would be achieved either by using numerical type dice or cubes which have colors on their surfaces other than primary and secondary colors. The odds for obtaining these additional play possibilities can also be determined mathematically. The use of two similar color cubes as explained provides a way to physically represent universal color formulas and equations that are as stable and as versatile as the mathematical formulas and equations which they parallel or represent. It is important to the present invention that a roll of a pair of game motivators such as the cubes 10 can potentially yield as many as forty two (42) possible plays or moves thereby changing the number of distinct possible options for each throw thereof. This increase in the total number of distinct play possibilities substantially enchances the options or strategy that can be used in playing a game utilizing the subject motivators and greatly increases game interest and game strategy as will be explained.

Figure 4:
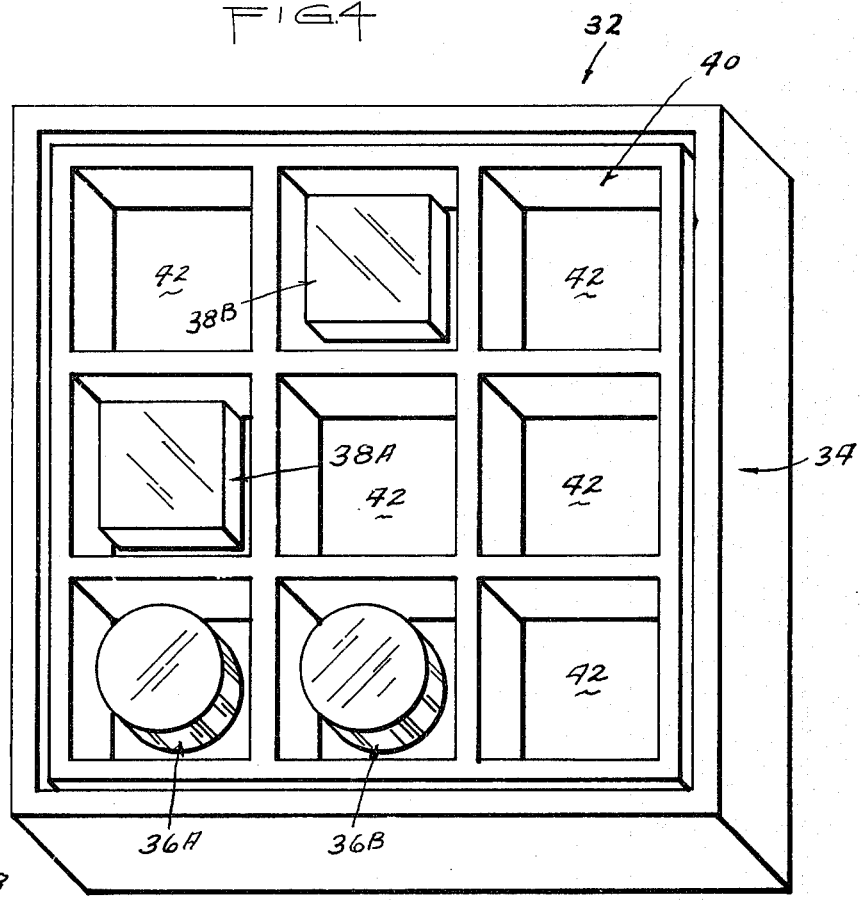
FIG. 4 is a perspective view showing a game board with playing pieces thereon constructed according to the teachings of the present invention, the playing of the game being controlled by motivators constructed as disclosed in FIGS. 1-3; and, FIG. 5 is a perspective view illustrating the different types of playing pieces which may be used in playing a game of the type disclosed herein.
Figure 5:
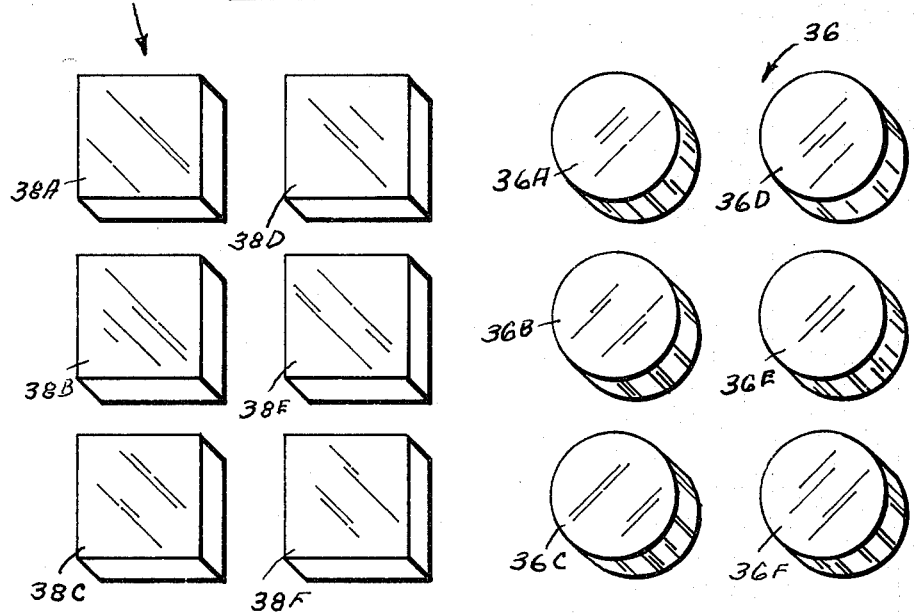

FIGS. 4 and 5 show one embodiment of a color selection type game where the moves of the playing pieces on a playing surface are determined by the cast of two similar colored motivators such as the color cube 10. Number 32 refers generally to a game apparatus including a game board 34 and a plurality of different colored objects or playing pieces identified generally by the numbers 36 and 38 for movement on the game board. The game board 34 has a playing surface 40 which is divided into a plurality of adjacent areas or squares 42 arranged similar to the grid characteristics of a tic-tac-toe, chess, checkers or other similar type game board.

Nine adjacent areas are shown in the game board 34 of FIG. 4. Although the game board 34 is shown as having separate areas 42 which are substantially similar in shape to one another and which total in number only nine such areas, it is recognized that areas such as the areas 42 may differ in characteristic form from one another by having different geometric shapes, sizes, and/or different indicia thereon, including different color indicia that corresponds respectively to the colors on the faces of the cubes 10, and it is anticipated that the total number of the areas 42 may likewise be increased or decreased as desired.

The objects or playing pieces 36 and 38 used in the playing of the game 32 include any desired number of such groups of playing pieces, each of the groups having a plurality of similar but differently colored objects such that each respective player controls the movement of playing pieces in one of said groups. For example, one player controls the playing pieces 36 which are shown in FIG. 5 as being cylindrical in shape, each playing piece 36 being colored respectively with one of the primary or secondary colors so as to correspond to the primary and secondary colors formed on the respective faces of each of the two cubes 10 as previously described. Similarly, another player controls the movement of the playing pieces 38 which are shown for illustrative purposed as being cubical in shape, each piece likewise being entirely colored with one of the primary or secondary colors. Each group of the playing pieces 36 and 38 are shown as containing six individual pieces so that each piece may be colored by a different one of the primary and secondary colors. Like the separate squares or playing areas 42 on game board 34, the total number of playing pieces in each group may be increased or decreased as desired so as to change the number of pieces and the complexity and strategy of the game. It is to be understood also that many different geometric shapes can be used for the playing pieces in addition to those shown and within the scope of the present invention, and additional groups of similarly shaped pieces may be added to accomodate any desired number of players or teams of players.

The method of play utilizing the above-described game apparatus and the game motivators 10 is as follows. The players agree in advance as to which group of similarly dimensioned playing pieces each player will control. The object of the particular game described is to capture all of the opponent's playing pieces from the game board, the sole player having only his playing pieces remaining on the game board at the end of the game being the winner. For convenience of explanation it is assumed that there are two players each controlling a group of six similarly dimensioned but differently colored playing pieces previously described and shown in FIG. 5. Play is started by the first player rolling the color cubes and placing the two playing pieces that correspond to the colors that turn up on the color cubes in the starting positions or playing areas 42 on his side of the playing surface 34, such as by placing the playing pieces 36A and 36B thereon. Testing has shown that the best way to begin the game is to roll the color cubes and let them control the introduction of the playing pieces. If the roll of the color cubes produces two different primary colors, the player rolling the cubes has the further option to place one playing piece of the appropriate secondary color on the playing board. This possibility is available for the first and for all later moves or turns and contributes substantially to the strategy and skill of the game. It is also possible to commence play by having each player place one or more of his playing pieces on the playing surface before play starts although this generally is not preferred. Each playing piece is initially positioned in one of the separate playing areas 42 along the side of the playing surface in front of the player who rolled the color cubes.

In order to determine which player will start the game each player will cast one color cube 10 (or 30) and the first player to call in advance the color that he rolls on his cube will begin play. Each player will then take his turn, in order, until the game is completed. The two color cubes 10 (or 30) are then thrown or rolled like dice by each player in turn with the faces that turn up being read by all players at the same time and used to control play.

The roll or cast of the color cubes determines the game plays or game move options that are available to the respective player as a result of the colors displayed on the upsides of the color cubes. If either or both of the colors on the upsides of the cubes 10, after being cast are the same as any of the three colored pieces previously placed in the starting positions on the game board, the player may move that corresponding piece or pieces to an adjacent unoccupied square. For example, if the roll of the cubes produces two primary colors yellow and blue, the player who cast the cubes may move either a yellow or a blue piece, if such are on the board, out of its starting position to an adjacent unoccupied playing area 42 or if both corresponding yellow and blue pieces are positioned on the playing surface, both pieces may be moved to adjacent playing areas. In addition, color combinations may likewise be played such that if two different primary colors turn up on the color cubes 10, those colors enable an additional play or move possibility not otherwise obtainable. Thus, if the roll of the color cubes produces the two primary colors of red and yellow on their upsides, the possible moves or options would indicate a play based on either moving a red, yellow, or an orange playing piece. In like manner, if the roll produces the two primary colors of yellow and blue on the upsides, the player's options would include plays related to blue, yellow, or green; and if the roll of the color cubes produce the primary colors of red and blue on the upsides, play or options related to red, blue, or purple are possible. These additional possibilities are available because the two primary colors that turn-up are combinable in a well known way to produce a secondary color. If, after rolling the two color cubes 10, a player has no playing pieces corresponding to the colors shown on the upsides of the cubes and, in the case of two different primary colors, no playing pieces corresponding to the secondary color produced therefrom, no moves are possible and the next player takes his turn. Play can also be varied further by coloring the playing areas 42 and restricting movement of the color pieces 36 and 38 relative thereto. It should be noted that the rules of play may be varied somewhat so as to increase or decrease the total number of moves allowed per toss of the cubes.

Once a player has moved a playing piece off one of the playing areas 42 designated as a starting position, he may then in turn bring one of his remaining reserve playing pieces, not already on the game board, into play on the now vacated starting playing area by rolling the color associated with a playing piece not already on the game board. In this manner, it is possible for a player to eventually have all of his playing pieces operative on the playing board thereby substantially increasing his opportunities for capturing his opponent's remaining pieces, In order to capture a playing piece of another player, using the game as disclosed, it is necessary for a player to maneuver at least one of his playing pieces to a position adjacent to one of his opponent's playing pieces. In other words, for a capture to occur two opposing playing pieces must be located on adjacent areas or squares 42 in any direction. Once the playing pieces are so maneuvered one of the players involved must roll the color cubes 10 so as to produce both the color of his playing piece and the color of his opponent's playing piece on the adjacent playing area. Once the two appropriate colors have been rolled, the respective player may then move his playing piece into the adjacent square containing his opponent's playing piece thereby capturing his opponent's piece and removing it from the playing board. Referring to FIG. 4, and assuming that the playing piece 36A is colored yellow and playing piece 38A is colored blue, then if either player in his turn rolls a yellow and a blue on the upside on the color cubes, this will entitle that player to move his yellow or blue playing piece into the square of his opponent's piece to capture it. This will depend upon the particular rules of play adopted prior to the start of the game. The player rolling the blue, and yellow cubes also has the other options of moving a blue, a yellow or a green piece one space or bringing a reserve piece into playing position if a vacant space is available. In this example, since playing pieces 36A and 38A are positioned adjacent to each other, it would probably be advantageous to capture the opponent's playing piece by moving the yellow pieces 36A onto the square occupied by the opponent's blue piece 38A thereby removing playing piece 38A from play. Since the playing pieces 36B and 38A are also located adjacent to each other either player could capture the other player's piece by an appropriate roll of the cubes. It is important to recognize in the game as described that a player's playing piece may capture an opponent's playing piece only if the two playing pieces are first maneuvered into adjacent positions. If the playing pieces are not adjacent to one another in any direction, then a player may only move his corresponding piece or pieces to an adjacent unoccupied square as previously described.

If a player has not taken advantage of his play options by moving his reserves onto the board 34, and in the process loses all of his playing pieces as originally positioned on the playing board, he has lost out and is not able to continue, and play will continue only between the remaining players until only one player remains with playing pieces on the board.

The game 32 can be played by any desired number of players or teams of players, the number being limited only by the size and shape of the playing board 34 and the total number of differently groups or sets of playing pieces. It is anticipated that the playing board 34 can be expanded in size to include numerous additional playing areas or squares 42 so as to accomodate four or more players, each player utilizing the squares along one side of the game board as his starting positions. In this regard it is recognized that the playing board 34 can be differently dimensioned to accommodate a desired number of players, such as by being square, hexagonal, octagonal, or any other polygonal shape. By expanding the size and shape of the game board and/or increasing the total number of players and/or playing pieces, the relative complexity of the game likewise increases making game strategy more difficult.

It is important to note that the rules of play for the game 32 may also be substantially varied so as to increase or decrease the total number of moves allowed per toss of the cubes. For example, whenever two different primary colors are produced on the upsides of the cubes 10, a player may be allowed to move all playing pieces colored with either one of the two different primary colors and/or all the playing pieces colored with the secondary color produced by combining the primary colors. Alternatively, movement may be restricted such that a player is entitled to move only one playing piece for each different color displayed on the upside of each color cube and only one piece corresponding to a secondary color. As another alternative, movement can be restricted such that when the two primary colors are combined to move a playing piece corresponding to the resulting secondary color, only playing pieces colored with the secondary color can be moved and the remaining pieces colored with the two primary colors are not movable. This also prevents a playing piece of the secondary color when moved by combining primary colors from capturing another piece during that turn. This particular restriction increases the complexity and strategy of the game by forcing a player to elect between moving playing pieces corresponding to either one or both of the two different primary colors or playing pieces colored with only the secondary color produced by mixing the two primary colors. Similarly, the rules of play can likewise be varied so as to specify a specific number of playing pieces, if any, which can be initially placed in the starting positions at the start of play, and the rules of play controlling how a player's reserve pieces may be brought into play on the playing board may likewise be varied so as to increase or decrease game strategy.

The present game represents one embodiment of the present invention wherein the game playing motivators 10 are utilized to determine and control game play. Another embodiment of the present invention illustrating the versatility of the subject motivators includes a game apparatus consisting of a plurality of colored blocks, such as the blocks or playing pieces 38, each block being colored with one of either the primary or secondary colors, and a pair of game motivators 10 wherein the respective faces of each of said motivators are colored as before by different ones of the primary and secondary colors. Before play begins, the colored blocks are randomly distributed onto the floor, table top, or other similar playing surface by one or more of the respective players. Each player then selects a single color block upon which to build a stack of colored blocks, the object of play being to build the tallest stack. The first player to roll the color of his selected block on the upside of a single color cube beings play. This player then rolls both cubes 10 and selects colored blocks that correspond in color to the colors on the upsides of the color cubes, including combinations produced therefrom when two different primary colors are exposed, placing those blocks that are selected on top of his previously selected block. For example, if a player rolls a red and a yellow on the upsides of the color cubes, he may choose a red, a yellow or an orange block, or any combination thereof depending upon the specific rules of play adopted at the start of play. If the upsides of the cubes are of the same color, the player may choose two blocks corresponding to that color.

The remaining players take their turn in order. If, after the color cubes are rolled, there are no blocks left on the playing surface which are identical in color to that shown in the upsides of the color cubes and one of the opposing players has any one of the rolled colors as the color of the top block in his stack, the player that rolled that color may remove the block from his opponent's stack. The remaining players take their turn in order. Should a player overturn or tumble his stack of blocks for any reason during play, the fallen blocks are returned to the playing surface and play continues. The player who achieves the tallest stack when all of the blocks are removed from the playing surface is the winner. It should be noted that no game board is required in playing this particular color selection type game, and the rules of play may be varied as desired so as to increase or decrease the game complexity and strategy required.

Although only two specific examples of color selection type games have been described, it is anticipated that the present game playing motivators may be utilized in the playing of many different games to determine and control game play or movement. In any game where the moves of a particular playing piece on a playing surface are determined by the cast of colored motivators such as the color cubes 10, it is possible during each turn to make a move of or to one or the other of the colors that are displayed on the upsides of the color cubes, and it is also possible to make a move that depends on a combination of the colors that turn up but only if those colors are two different primary colors. It may also be possible when two different primary colors are displayed on the upsides of the color cubes to attach some special award or penalty thereto such as to take a card that corresponds in color to the color obtained by combining the two primary colors that turn up. There are many other possibilities along these and other lines that can be obtained. The odds of two different primary colors turning up can also be determined mathematically and used for various gambling and other purposes. On the other hand, if a primary and a secondary color turn up when the cubes are cast, it is possible to provide a movement or other form of play between or to one of the indicated colors but it is not possible or practical to combine the colors to produce another meaningful color. It can therefore be seen that by using the present motivators in conjunction with various game apparatus, an increased number of possible plays are made possible for each cast of the cube members as compared to other known types of motivators. A person using the present game motivators therefore has the opportunity to develop greater skills and greater strategy of plays than otherwise would be possible and this greatly increases game interest. At the same time, the present color motivators teach a simple method of learning the basic colors and associated mixtures thereof which is particularly beneficial for teaching familiarity with color mixtures to children. The present game motivators can also be used in greater numbers to further increase game strategy and game play possibilities and to play a variety of other games.

Figure 3:
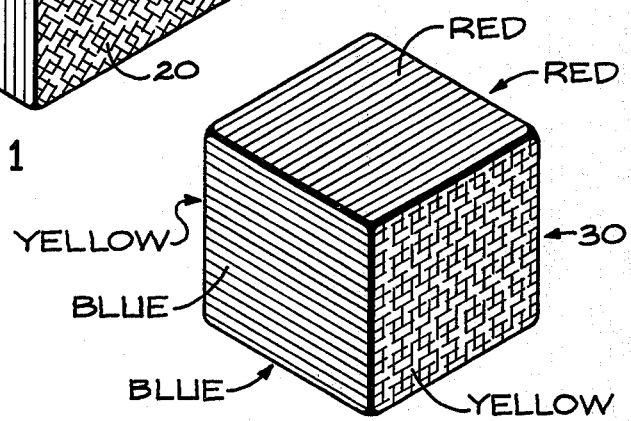
FIG. 3 is a perspective view of a modified form of the present cube-like member having only the primary colors thereon.
Figure 2:
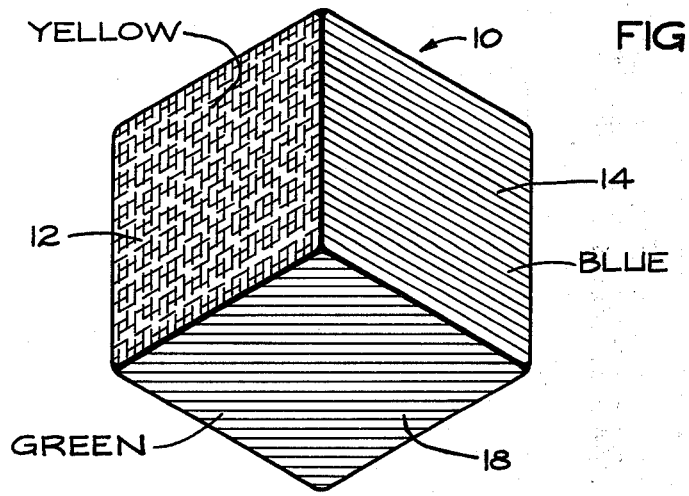
FIG. 2 is a view of the same member but showing other surfaces thereof.

It is also possible as shown in FIG. 3 to construct the subject motivators 30 to have different combinations of colors including only the various primary colors. This further changes the number of possible plays or moves obtainable by casting two such members and changes the playing odds and strategy. For example, each of the color cubes 30 can have two surfaces colored yellow, two surfaces colored blue, and two surfaces colored red. If this is done, when the subject cubes are thrown, there is a greater possibility of having two different primary colors turn up giving the option to the player of a play or move related to the primary colors and to a combination of the primary colors. The odds of having two different primary colors turn up when the cubes are constructed in this manner are different than in the case where each cube has all of the primary and secondary colors as in the construction 10 explained above. There may also be occasions when two or more primary only colored cubes can be used to play a game or for some other purpose, and it is also possible to further change the number of possible plays or moves by interchanging the number of sides of the cubes 30 that have each of the different primary colors on them. For example, a cube 30 could be constructed to have one yellow surface, two blue surfaces, and three red surfaces or other like combinations of the primary colors. Such a construction affords the possibility of even other probabilities for certain combinations thereby enabling changing of the odds that certain colors or color combinations will turn up. It should also be noted that the subject cubes 30 and all variations thereof may likewise by utilized in all embodiments of the present invention. It is also contemplated to use one or more cubes with only primary colors thereon with cubes that have both primary and secondary colors to further change that odds.

Thus there has been shown and described a novel game apparatus that includes game and/or gambling motivators including at least two colored cubes each having a different primary or secondary color on each of its respective surfaces, or different combinations of the various primary colors only on its surfaces, which cubes are utilized to effect and control game play, said game apparatus and motivators fulfilling all of the objects and advantages sought therefor. It will be apparent to those skilled in the art, however, that the present games and game motivators are not limited to use with any particular game or type of gambling, but can be used with many different color selection type games and for other uses as well including for games of chance to change or modify the odds and increase the number of possible plays for each toss thereof. All changes, modifications, variations and other uses, purposes and applications for the subject games and game motivators which do not depart from the spirit and scope of the invention are deemed to be covered by the invention which is limited only by the claims which follow.

What is claimed is:

1. A game apparatus for playing color oriented games wherein colored game motivator devices are utilized to control game play, said apparatus comprising a playing board having a plurality of distinct playing areas positioned thereon, a plurality of colored playing pieces, each of said playing areas and each of said playing pieces being colored by a different one of the respective primary and secondary colors of red, yellow, blue, green, orange, and purple, and a game motivator for producing color combinations for use in controlling the positioning of the playing pieces on said playing board, said motivator including a pair of similar dice-like devices each of which is cube shaped and balanced to equalize the possibility of each of its surfaces turning up when tossed on a surface, each of said dice-like devices being defined by six colored plane surfaces arranged in opposed pairs, at least one surface of each of said dice-like devices being colored red, another yellow, and another blue, said dice-like devices when thrown on a surface being capable of producing on the upper surfaces thereof a plurality of different combinations of colors thereon to control the moves of the colored playing pieces on the playing board, the coincidences of the primary colors appearing on the upper surfaces of the game motivator devices determining the possible game move options such that when two different primary colors turn up a possible game move option can be additionally made based upon the resultant secondary color obtained by combining said different primary colors, said secondary color not being found on any surface of said game motivator devices.

2. Game means for playing a color motivated game based upon the primary colors of red, yellow, and blue and on the secondary colors of orange, green, and purple comprising a playing surface, a plurality of playing pieces, and game motivator means, said motivator means including a pair of similar dice-like objects, each of said objects being balanced and having at least six faces thereon, said faces of each dice-like object each having a different respective one of the colors of red, yellow, blue, orange, green, and purple thereon, said playing surface including thereon a plurality of distinct adjacent playing areas for accommodating respective ones of the playing pieces, each of said playing areas being colored with a different one of the colors associated with the faces of said dice-like objects, each of said playing pieces being colored with a different one of the respective colors associated with the faces of said dice-like objects, said objects adapted to be cast like dice upon a surface and to come to rest thereon to present upper faces thereof to view, each cast of said ojects establishing a respective color pair on the upper faces thereof, said color pairs controlling the positioning of said playing pieces in relationship to one another and to said playing areas such that the coincidences of the primary and secondary colors appearing on the upper faces of said dice-like objects determines the possible game move options including move options based upon the turning up of two primary colors, a primary and a secondary color, and two secondary colors, and when two different primary colors turn up the strategic possibility of combining said primary colors to obtain a game move option based upon the resultant secondary color produced thereby.

3. Game means for playing a color motivated game based upon the primary colors of red, yellow, and blue and on the secondary colors of orange, green, and purple comprising a plurality of playing pieces, a playing surface having thereon a plurality of adjacent playing areas for accommodating respective ones of the playing pieces, and game motivator means, said motivator means including a pair of similar dice-like objects, each of said objects being balanced and having at least six faces thereon, said faces of each dice-like object each having a different respective one of the colors of red, yellow, and blue thereon, each of said playing pieces and each of said playing areas being colored with a different one of the colors associated with the faces of said dice-like objects and a different one of the secondary colors of orange, green and purple, said objects adapted to be cast like dice upon a surface and to come to rest thereon to present upper faces thereof to view, each cast of said objects establishing a respective color pair the colors of which are associated with the upper faces of said objects, said color pairs determining the positioning of said playing pieces in relationship to one another and to said playing areas such that the coincidences of the primary colors appearing on the upper faces of said dice-like objects controls and determines the possible game move options including move options based upon the combinations of two of the same primary colors, combinations of two different primary colors, and when two different primary colors turn up the strategic possibility of combining said primary colors to obtain a game move option based upon the resultant secondary color produced thereby.

4. In a game where color is a factor, a plurality of colored playing pieces, a playing surface divided into a plurality of distinct adjacent playing areas for accommodating respective ones of the colored playing pieces, and a game motivator for producing color combinations for use in determining and controlling movements of the playing pieces on the playing surface, said motivator including a pair of similar cube shaped devices each of which is balanced to equalize the possibility of each of its sides turning up when thrown on a surface and defined by having six plane surfaces arranged in opposed pairs, each of said surfaces being colored respectively by only one of the primary colors of red, yellow, and blue, at least one of said surfaces being colored by red, at least one of said surfaces being colored by yellow and the remaining surfaces being colored blue so that when said devices are thrown like dice on a surface they are capable of producing on their upper surfaces a plurality of different color combinations to control the movement of the colored playing pieces on the playing surface, the coincidences of the primary colors between said motivator devices determining the possible game move options including game move options based upon combinations of two of the same primary colors, combinations of two different primary colors, and when two different primary colors turn up the strategic possibility of combining said primary colors to obtain a game move option based upon the resultant secondary color, said secondary color not being found on any surface of the motivator devices, said playing pieces including at least two sets of playing pieces, the individual playing pieces in each set being colored to correspond respectively to different ones of the primary colors on the motivator devices and to the secondary colors of orange, green and purple.

5. In the game defined in claim 4 wherein two of the surfaces of each of said cube shaped devices are colored red, two are colored yellow, and two are colored blue.

6. In the game defined in claim 4 wherein a different number of surfaces on each of said cube shaped devices are colored red than are colored blue.

* * * * *

UNITED STATES PATENT OFFICE
CERTIFICATE OF CORRECTION

Patent No. 4,335,879        Dated June 22, 1982

Inventor(s) Darrell D. Wiskur

It is certified that error appears in the above-identified patent and that said Letters Patent are hereby corrected as shown below:

Column 6, line 45 "play" should be --plays--

Column 8, line 56 "beings" should be --begins--

Column 10, line 24 "by" should be --be--

Signed and Sealed this

Tenth Day of August 1982

[SEAL]

Attest:

GERALD J. MOSSINGHOFF

Attesting Officer    Commissioner of Patents and Trademarks